Patented Oct. 16, 1923.

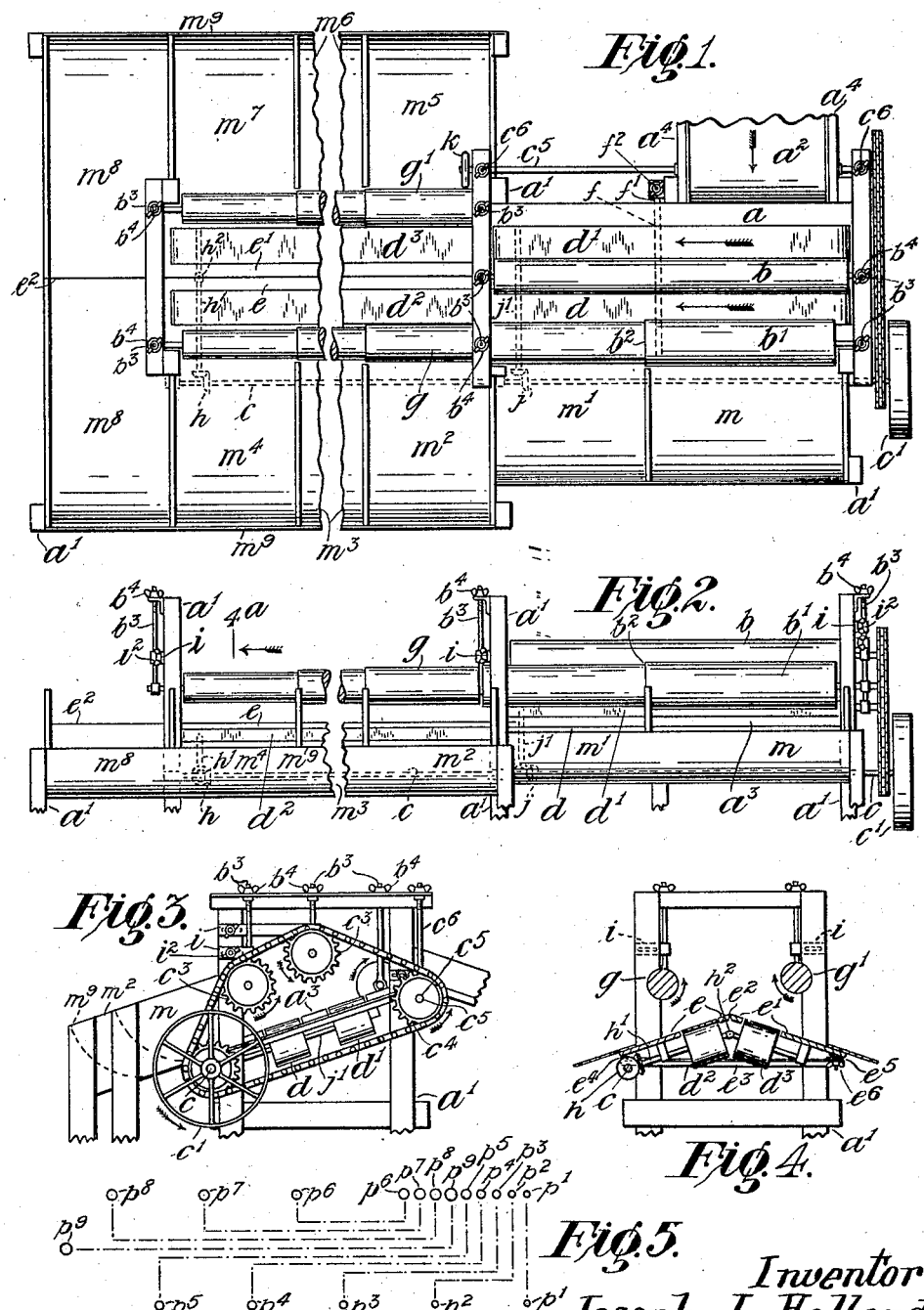

1,471,128

UNITED STATES PATENT OFFICE.

JOSEPH LEONARD HOLLAND, OF SHEPPARTON, VICTORIA, AUSTRALIA.

GRADING MACHINE PRINCIPALLY FOR FRUIT.

Application filed January 15, 1923. Serial No. 612,800.

*To all whom it may concern:*

Be it known that I, JOSEPH LEONARD HOLLAND, a subject of the King of Great Britain and Ireland, residing at Shepparton, in the State of Victoria, Commonwealth of Australia, have invented certain new and useful Improvements in Grading Machines Principally for Fruit; and I do hereby declare the following to be a full, clear, and exact description of the invention, such as will enable others skilled in the art to which it appertains to make and use the same.

This invention relates to a machine for grading articles, particularly peaches, apricots, and other soft fruits, according to sizes, without bruising or injuring them.

Parts of the machine are made adjustable to enable it to grade to sizes wanted, and to allow of regulating its speed of operation. Rollers are used, under one or more of which, during their rotation, articles to be graded pass. Some articles before so passing travel along a rotating roller or rollers until a place is reached where one or more of the articles pass under a roller. The rollers are stepped—except in some cases a preliminary roller—and have suitably soft (as rubber) surfaces, but I claim no novelty in stepped roller or rubber surfaces in grading machines.

The invention is explained hereinafter with reference to the accompanying drawings, but the construction may be varied so long as the matter of any of my claims is retained.

In the drawings, Figure 1 is a plan of one form of my machine, omitting portions to save space in drawing.

Figure 2 is a front elevation of the machine, likewise omitting portions.

Figure 3 is an elevation of the receiving end of the machine.

Figure 4 is a section across the machine on line $4^a$.

Figure 5 is a diagram of travel courses of nine articles in my machine. These articles are of progressively increasing sizes, $p^1$ being the smallest and $p^9$ the largest.

$a$ is a table to receive articles to be graded from any suitable source; as feed conveyor $a^2$. The table slopes (see Figure 3) transversely downward, and is mounted upon a frame $a^1$.

Conveyor $a^2$ is shown as a belt which is movable between sides $a^4$ and is positioned by suitable means which will be well understood to feed the articles at a level with the receiving edge of table $a$.

The surface of table $a$ includes longitudinal belt conveyors $d^1$, $d$, having their conveying surfaces transversely inclined as in Figure 3. These conveyors have a non-moving part $a^3$ of table $a$ between them. They move from the receiving end of the table (shown by arrows in Figure 1) and transfer longitudinally articles which are fed on them, to an adjoining conveying belt $d^3$ or $d^2$, the top surfaces of which form parts of tables which slope as next stated. The surface of belt $d^2$ and its table slope in the same direction as does table $a$, but the surface of belt $d^3$ and its table slope in the opposite direction to the slope of table $a$ and belts $d^1$, $d$. There are thus opposed slopes, as in Figure 4, having an apex $e^2$.

The various tables are adapted when desired to allow of varying their slopes. Thus at $e^2$ and at $e^4$ there is in each case a hinge; and at $e^5$ there is a hinge—the latter slidably connected to a support $e^3$, and provided with means to fix it when adjusted, as a lock nut $e^6$. The table slopes are simultaneously altered, as is made clear hereinafter.

For regulation of table inclination, I attach to a table a bar $f$ (Figure 1) the outer part $f^1$ of which can be raised or lowered relatively to a frame stem $f^2$, and can be fixed in the adjusted position. This will regulate also the incline of the table $e$, $e^1$ having the conveyor belts $d$, $d^1$, because table $e$ is integral with table $a$, and by reason of the said hinges, adjustment of table $e$ adjusts table $e^1$.

Above table $a$ are rollers, $b$, $b^1$, of which at least the latter is stepped, as at $b^2$; it will have any plurality of steppings.

The step $b^2$ is to allow of grading small articles which pass to roller $b^1$ after passing under roller $b$.

Above each table $e^1$ and $e$, is a stepped roller, $g^1$, $g$ respectively. Each conveyor belt $d$, $d^2$, (these are integral in some cases), and $d^1$, $d^3$, travels over suitable pulleys, which are well known as conveyor elements and are therefore not illustrated.

Under each stepped roller there will be successively higher spaces, relatively to the direction in which articles to be graded are carried by the belt so that the larger the article, the farther it must travel to reach a place where the roller has enough clearance under it, but over the table, to let the article pass below the roller. At such a point the article moves under the roller by gravity because of the transverse slope of the surface it rests on. The rollers are rotated in the opposite direction to that in which gravity moves the articles, consequently articles cannot be pinched as they pass under rollers.

The roller axles have end bearings having adjustable supports secured in adjusted position as by nuts. The rollers are adjustable laterally of the tables by means of slotted bars $i$, having adjustment retaining nuts $i^2$. The roller axle supports $b^3$ when adjusted to the height required are held by nuts $b^4$. Supports $b^3$ have bars $i$ attached to them and slidable laterally, supports $b^3$ being thereby slidable laterally. Nuts $i^2$ are upon screw threaded bolts which project through slots in bars $i$.

By means of the main shaft $c$ carrying a sprocket driven by pulley $c^1$, the roller axles which carry sprockets $c^3$, Figure 3, are rotated by a chain $c^2$, which is driven by the sprocket of shaft $c$. I make this chain engage also sprocket $c^4$ on a drive axle $c^5$ of feed conveyor $a^2$, the latter axle having bearings, carried by the adjustable stems $c^6$.

Articles to be graded are placed upon conveyor $a^2$, and will, without being damaged, be delivered on table $a$, down which they roll (see Figure 3) the larger ones being stopped by roller $b$, while the small pass under that roller, and each roller $b^1$ under which some of the articles at once pass and enter a first receiver $m$. Part of the grading is thus accomplished.

Articles which reach but cannot pass under roller $b$ are carried by belt $d^1$ to table $c^1$ their subsequent movement being explained hereinafter.

Articles which reach roller $b^1$ but cannot pass under it at once are carried longitudinally by belt $d$ till they pass the stepping $b^2$, and if the height beyond the stepping is great enough, the articles pass by gravity under the roller and enter a second receiver $m^1$.

Articles too large to enter the latter receiver are transferred by belt $d$, to belt $d^2$, by which they will be moved as hereinafter explained.

Reverting now to tables $e^1$ and $e$, conveyor belt $d^3$ receives from conveyor $d^1$,—and conveyor belt $d^2$ receives from conveyor $d$. The articles are carried by belting $d^3$, $d^2$ till they reach a roller part of sufficiently small diameter to enable them to pass by gravity on the table under the roller.

Each belt $d^3$ and $d^2$ is driven suitably. Thus, see Figure 4, shaft $c$ carries a bevel gear $h$, which drives a bevel gear on a shaft $h^1$ of a pulley of belt $d^2$ and the shaft of a pulley of the belt $d^3$ is coupled to shaft $h^1$ by a suitable joint $h^2$. Belt $d^1$ is driven from shaft $c$ by the gears $j$, and shaft $j^1$, dotted in Figure 1. The roller $g$ is coupled to and driven by roller $b^1$, or these rollers are integral. Roller $g^1$ is rotated in the opposite direction by a friction disc $k$ that is fixed upon an extension of the conveyor axle $c^5$. This friction disc is faced with resilient material as rubber and may be bevelled and the end of the roller be bevelled correspondingly.

Each grading table, $e^1$, $e$ has adjoining its roller receivers for articles which become graded according to the steppings. Thus $m^2$, $m^3$, $m^4$, are respective receivers next to roller $g$ and $m^5$, $m^6$, $m^7$, are respective receivers next to roller $g^1$. Rollers $g^1$ and $g$ rotate as shown by arrows in Figure 4 so as not to pinch the articles to be graded. An end receiver $m^8$ is provided for those articles which are too large for any other receiver. I prefer that the outer edge, $m^9$, of each receiver shall curve upwardly.

I claim:—

1. In a grading machine, a transversely inclined table to receive articles to be graded, a grading roller over the upper part of said table, another grading roller, said latter roller being stepped and over a lower part of the said table, and means for rotating the rollers in the direction opposed to that in which articles to be graded move by gravity.

2. In a grading machine, a transversely inclined table, a grading roller over said table, another roller being stepped and over a lower part of the said table, means for rotating the rollers in the direction opposed to that in which the articles to be graded move, by gravity, and conveyors to support articles to be graded and convey them longitudinally of the rollers while allowing articles, according to their size, to pass under different parts of the rollers.

3. The construction specified in claim 1, and means to adjust the inclination of said table.

4. In a grading machine, a transversely inclined table, a grading roller over said table, another roller being stepped and over a lower part of the said table, means to adjust the table incline, means for rotating the rollers in the direction opposed to that in which the articles to be graded move, by gravity, and conveyors to support articles to be graded and convey them longitudinally of the rollers while allowing articles, according to their size, to pass under different parts of the rollers.

5. The construction specified in claim 2, and means to vary the distance of the rollers above the table.

6. The construction specified in claim 2, and means to vary the positions of the rollers laterally of the table.

7. In a grading machine, a transversely inclined table, a grading roller over said table, another roller being stepped and over a lower part of the said table, means for varying roller height over the table, means for varying roller position laterally of the table, means for roller rotation in the direction opposed to that in which the articles to be graded move, by gravity, means to convey articles longitudinally while the articles bear on the rollers, said rollers being spaced at different heights from the table to allow articles, according to their sizes, to pass beneath the rollers.

8. In a grading machine, a transversely inclined table, a grading roller over said table, another roller being stepped and over a lower part of the said table, means for rotating the rollers, conveying belts at the table surface to convey articles longitudinally of the rollers, and means to drive a conveyor to feed articles to the table, and means to drive the conveying belt aforesaid.

9. A grading machine comprising a transversely inclined grading table, grading rollers spaced at different distances from said table, means whereby articles to be graded are fed along said rollers, two grading tables adjacent said first table and adapted to receive articles from said means, said two grading tables being transversely inclined in opposite directions, grading rollers over the two tables, and means to rotate the last-named rollers.

10. The construction specified in claim 9, and means to simultaneously adjust the inclinations of the tables.

11. The construction specified in claim 9, and two oppositely inclined tables hinged together at their upper portions, the lower portion of one table being slidable for purposes of adjustment, and means to secure said lower portion of the table in its adjusted position.

12. In a grading machine, a transversely inclined table having upper and lower parts, a grading roller over said table, another grading roller over a lower part of the table, two oppositely inclined tables at the end of the first-named table, a grading roller above each of said last named tables, means for rotating each roller in the direction opposed to that in which the articles move by gravity, and receivers for the graded articles.

13. In a grading machine, an inclined grading table, oppositely inclined grading tables adjoining said first named table, grading rollers over the first table, a grading roller over each of the other tables, said rollers being vertically and transversely adjustable, and conveyors to move articles to be graded in contact with rollers to points where the articles pass under the rollers.

14. A grading machine having inclined tables, conveyors, grading rollers having varied diameters, means to rotate each roller in the opposite direction to the downward inclination of the table under it, means to adjust said rollers vertically and laterally, and means to adjust the table inclinations.

In witness whereof I have hereunto set my hand.

JOSEPH LEONARD HOLLAND.

Witness:
GEORGE G. TURRI.